United States Patent [19]

Brunner et al.

[11] 4,311,871

[45] Jan. 19, 1982

[54] STRAND-SEPARATION ARRANGEMENT AND A METHOD FOR SEPARATING THE STRANDS OF A MULTI-CONDUCTOR ELECTRICAL CABLE

[75] Inventors: Hans-Peter Brunner, Greifensee; Thomas Caldor, Niederrohrdorf; Helmut Orgler, Wettingen, all of Switzerland

[73] Assignee: BBC Brown, Boveri & Company, Limited, Baden, Switzerland

[21] Appl. No.: 7,975

[22] Filed: Jan. 31, 1979

[30] Foreign Application Priority Data

Mar. 23, 1978 [CH] Switzerland .................... 3207/78

[51] Int. Cl.³ ............................................. H02G 15/00
[52] U.S. Cl. ............................. 174/74 A; 174/DIG. 8
[58] Field of Search ................ 174/74 R, 74 A, 75 R, 174/DIG. 8

[56] References Cited

U.S. PATENT DOCUMENTS 3,669,824  6/1972  Hess .............................. 174/DIG. 8

FOREIGN PATENT DOCUMENTS 1378076  8/1963  France ............................. 174/74 A
1149611  4/1969  United Kingdom ............. 174/74 A Primary Examiner—Roy N. Envall, Jr.
Attorney, Agent, or Firm—Burns, Doane, Swecker & Mathis

[57] ABSTRACT

A strand separation arrangement is disclosed wherein a multi-conductor power cable is separated into individual strands. Each of the strands is provided with a thick walled shrunk-on tubing which extends into a sheath surrounding the power cable. The sheath is provided with a plurality of clefts arranged axially about a circumference of the end of the sheath to permit the sheath to expand circularly. Various bandages and shrunk on tubes surround the place of separation of the strands with a shrunk on fitting piece sealing the entire arrangement. Additional mechanical strength is provided for the separation arrangement by the present invention.

11 Claims, 1 Drawing Figure

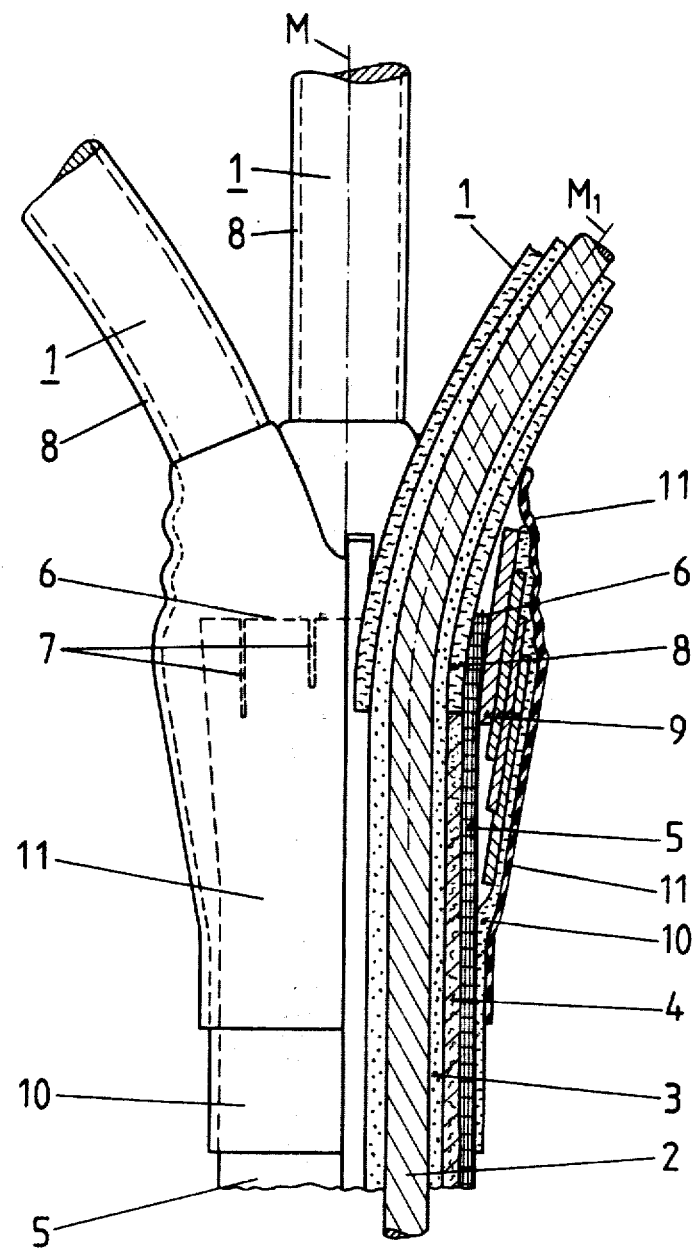

STRAND-SEPARATION ARRANGEMENT AND A METHOD FOR SEPARATING THE STRANDS OF A MULTI-CONDUCTOR ELECTRICAL CABLE

BACKGROUND AND SUMMARY OF THE PRESENT INVENTION

The present invention relates generally to multi conductor power cables and to separations of the conductors of the power cables.

Typically, a sheath surrounds a plurality of strands in a multi-strand power cable. The sheath is separated together with fillers and any existing bandages of the multi-conductor power cable at a point of break-down. A border zone of the sheath so generated is then covered up with bandages or a fitting piece. Accordingly, a neat cover is provided for the cable, and both water and other undesirable foreign matter are prevented from entering the inside of the cable. Such an arrangement for the separation of strands of a power cable, however, lacks a sufficient mechanical strength necessary to sustain forces which will occur during powerful short-circuit currents.

In power networks subjected to high short-circuit currents, rails or single-conductor cables at wide phase spacing are usually employed. Such conductor systems are not only costly but also require in most instances additional equipment for their installation. Furthermore, such arrangements will often result in an unacceptably high voltage drop. Therefore, (for power networks for the intrinsic needs of nuclear power plants) special cables were developed. These special cables include, in addition to other measures, bandages that are placed under the sheath to improve the resistance of the cables in the event of short circuits.

If the above-discussed measures for separating the strands of a power cable are used in the case of the special cables, a sharp edge is created at the dividing zone of the cable after the bandage or the sheath has been cut. The strand insulations will then be pressed against the edge by the forces activated during the short-circuit current. Such pressure against the edge will likely cause compressive deformations and indentations in the insulation of the strands, resulting in sheath fractures as well as axial shifts between the insulation and the sheath. The insulations are eventually punctured and the effectiveness of the arrangement for the strand separation will be completely destroyed.

It is therefore a particular object of the present invention to provide an arrangement for the strand separation of a multi-conductor power cable which arrangement can be used in networks having extremely high short-circuit currents.

It is another object of the present invention to provide a separation arrangement for a power cable which can absorb the same degree of mechanical forces generated by short-circuit currents at the unseparated cable.

Finally, it is an object of the present invention to provide a separation arrangement for a power cable which can be manufactured by an economical and simple method.

The present invention solves these and other problems in the manner set forth in the following detailed description of the present invention.

In this way, it is advantageous that the resistivity of the strand insulations and of the cable sheath to the effects of the mechanical forces, especially those mechanical forces generated by powerful short-circuit currents, is strengthened. The strengthening occurs as a result of the distribution of the pressure, exerted by the edges, over a relatively large area.

An advantageous application of the present invention, directed at a greater resistance to short-circuit currents, employs simple and commercially available members in the arrangement of the present invention.

A particularly effective protection against leakage current is attained by shrunk-on members of the present invention.

The use of a shrunk on fitting member to enclose the separation structure provides mechanical and chemical protection, for example to prevent any moisture from entering the cable.

BRIEF DESCRIPTION OF THE FIGURE

With reference to the appended single FIGURE, a preferred embodiment of the present invention is illustrated in cross-section with like members bearing like reference numerals.

DETAILED DESCRIPTION OF THE PREFERRED EMBODIMENT

With reference to the single FIGURE, a multi-conductor power cable includes three strands 1 with each strand including a conductor 2 and insulation 3. The three strands 1 are surrounded by a bandage 4 and a sheath 5. A sheath border 6 is provided with a plurality of clefts or cut-ins 7 terminating at the sheath border. A tube 8, consisting of flexible and mechanically resistant material, is shrunk onto the strand 1 between the sheath 5 and the sheath insulation 3. The tube extends into the slotted sheath interior. Within the area of the sheath border 6 there is arranged a resilient and mechanially resistant bandage 9 which surrounds the sheath 5 as well as the strands 1 and which is supported by a thick-walled shrunk-on tubing 10. The tubing 10 is likewise mechanically resistant.

A shrunk-on fitting piece 11 of very great mechanical strength covers the entire dividing zone of the multi-conductor power cable.

For the purpose of producing an arrangement of this type, the bandage 4 and the sheath 5 of the power cable are cut in such manner that a substantially circular, unobstructed sheath border 6 is formed upon the removal of the portion of the sheath or bandage facing the cable end.

The bandage 4, and/or the sheath 5 are loosened by the plurality of axially arranged clefts or cut-ins 7 which are different in length and which are uniformly spaced over the sheath perimeter. For example, the cut-ins 7 can be short and long alternatingly and can be separated from each other by about the thickness of the strand diameter. The cut-ins extend in length up to about the thickness of the cable diameter and will terminate at the sheath border 6. The cut-ins serve to substantially increase the ability of the sheath and the bandage 4 to expand circularly.

A padding and fortification of the strand insulation 3 is accomplished by padding elements which include a plurality of thick-walled shrunk-on tubes 8 that are pulled onto the exposed part of the strands 1. The tubes 8 are pushed inside the cable so that the tubes will extend along each strand from inside the cable up to and beyond the sheath border 6. The tubes 8 are shrunk rigidly onto the strands 1 by increasing the temperature of the tubes, for example by use of a hot-air blower.

When used for high-voltage cables, the shrunk-on tubes 8 also have a voltage potential controlling function and there is a possibility of a dual radial design in a mechanically active and voltage potential controlling tubing.

The reinforcement of the sheath border 6 and the improvement of the elasticity of the dividing zone as well as the increase in the mechanical and tensile strength of the sheath 5 are accomplished by support elements which include a multiple bandaging 9. The bandage 9 is most advantageously wound initially around the sheath border 6 in such manner that the exposed strands 1 as well as the uncut sheath 5 are covered in each case by about one half of the bandage 9. The bandage 9 is then wound in a helical fashion across the sheath border 6 and around the sheath 5 within the region of the dividing zone.

To provide an additional support for the bandage 9, the support elements also include a thick-walled shrunk-on tubing 10. The tubing 10 is pulled over the bandage 9 and is shrunk onto both the bandage 9 and a portion of the sheath by heating the tubing 10 to a sufficiently elevated temperature.

Finally, a mechanically active shrunk-on fitting piece 11, having three openings for the strands 1 and one opening for the multi-conductor cable, is moved from the cable end over the place of separation. The fitting piece is shrunk onto the place of separation at an increased temperature so that the entire arrangement for strand separation is closed off and sealed in a water tight manner.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. A multi-conductor power cable having a separation of the conductors, comprising:
    a plurality of strands of the power cable, each strand including:
    an electrical conductor; and
    insulation means for electrically insulating said electrical conductor;
    a sheath surrounding the plurality of strands;
    means for permitting the sheath to expand circularly at an end of the sheath;
    means for mechanically strengthening the insulation means of each of the electrical conductors; and
    means for mechanically strengthening the sheath in the vicinity of the end of the sheath.

2. The multi-conductor power cable of claim 1 wherein the means for permitting the sheath to expand circularly includes a plurality of circumferentially arranged clefts provided at the end of the sheath.

3. The multi-conductor power cable of claim 1 wherein the means for mechanically strengthening the insulation means includes a padding provided for each of the strands of the power cable, the paddings each extending from within the sheath to beyond the end of the sheath.

4. The multi-conductor power cable of claim 1 wherein the means for mechanically strengthening the sheath in the vicinity of the end of the sheath includes at least one externally applied support element which is provided on the sheath.

5. The multi-conductor power cable of claim 2 wherein the clefts extend axially of the sheath and have various lengths.

6. The multi-conductor power cable of claim 3 wherein the padding of each strand includes a tube member which is shrunk onto the respective strand.

7. The multi-conductor power cable of claim 4 wherein the means for mechanically strengthening the sheath in the vicinity of the end of the sheath includes a bandage which is wrapped around the sheath and a tube member that is shrunk onto the bandage.

8. The multi-conductor power cable of claim 7 further comprising:
    sealing means for preventing water from coming into contact with the end of the sheath, the sealing means including an external member which is shrunk onto the tube member.

9. A method of separating conductors of a multi-conductor power cable, comprising the steps of:
    terminating a sheath of the conductors at a predetermined location of separation of the conductors;
    cutting an end of the sheath to permit the sheath to expand circularly;
    urging a tube member loosely surrounding each of the conductors into the end of the sheath;
    shrinking each of the tube members onto the respective conductors;
    wrapping a bandage around the plurality of conductors in the vicinity of the end of the sheath; and
    shrinking a tube member on the bandage.

10. The method of claim 9 wherein the end of the sheath is cut at a plurality of circumferentially arranged locations about the sheath and wherein the sheath is cut axially of the sheath with all of the cuts having various lengths.

11. The method of claim 9 further comprising the step of:
    sealing the separation of the multi-conductor power cable to prevent water from contacting the sheath by shrinking an external member onto the tube member.

* * * * *